June 12, 1945.  H. A. STILSON  2,378,253
ANIMAL TRAP
Filed March 2, 1942
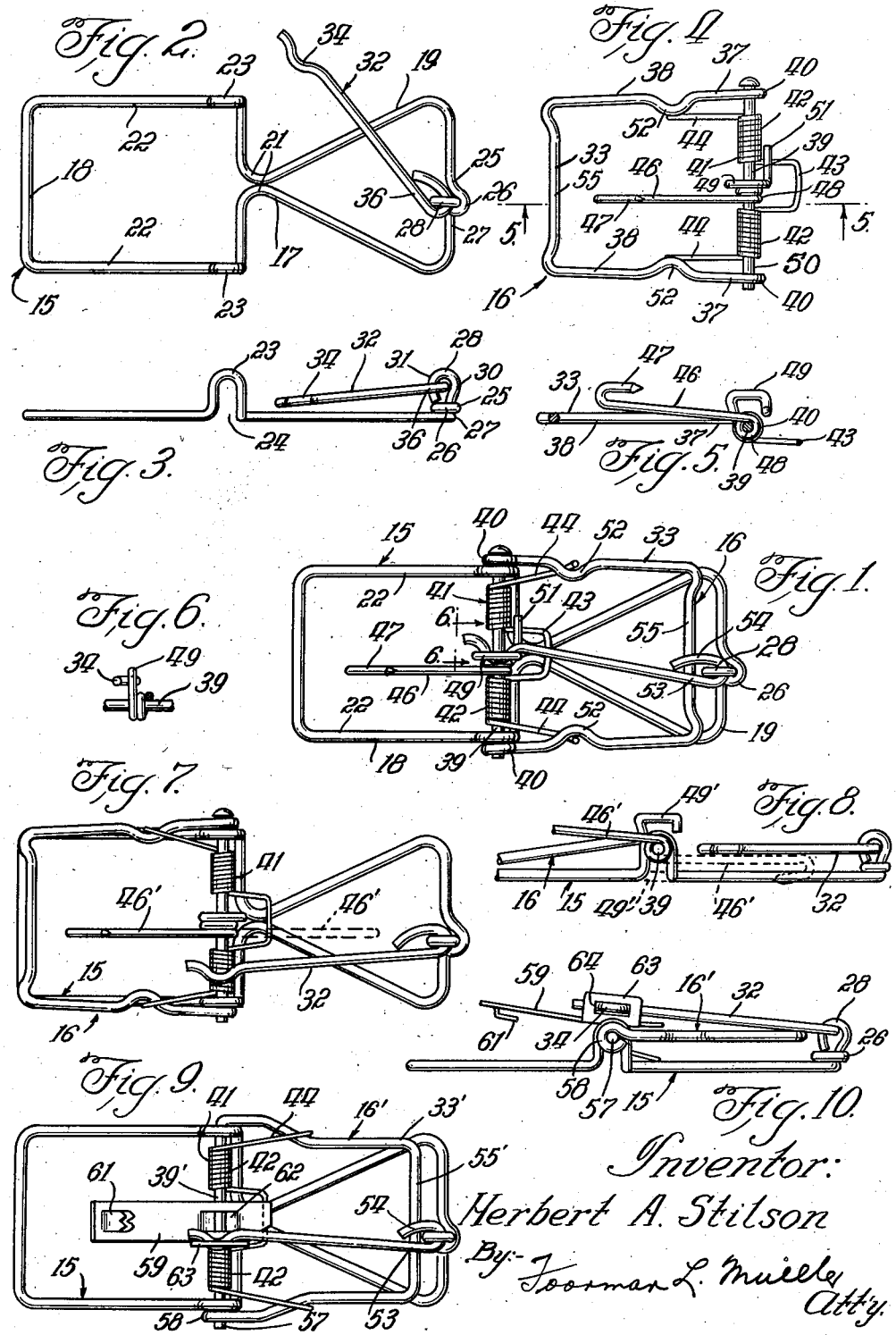
Inventor:
Herbert A. Stilson
By Foorman L. Mueller
Atty.

Patented June 12, 1945

2,378,253

UNITED STATES PATENT OFFICE 2,378,253

ANIMAL TRAP

Herbert A. Stilson, Chicago, Ill., assignor to McGill Metal Products Corporation, Marengo, Ill., a corporation of Illinois Application March 2, 1942, Serial No. 432,940

10 Claims. (Cl. 43—81)

This invention relates generally to animal traps and in particular to an improved animal trap of all metal construction.

In the prior art animal traps of the type including a spring actuated jaw and a latch for locking the jaw in a set position, the latch is generally composed of a single piece of wire formed at one end with a loop for pivotal connection with another loop or staple carried on a base member. The staple in the base is usually positioned transversely of the base so that the loop on the latch is in a vertical plane longitudinally of the base when the jaw is in a set position. The latch is thus pivotally movable in an arcuate path at the staple which lies in the plane of such staple or in a plane transversely of the base. Most of the latches in the animal traps of the above noted type have an offset portion at the end thereof opposite the loop for operatively engaging a catch portion on a pivoted bait treadle. The engagement of the latch offset portion with the bait treadle providing for the most sensitive releasing of the jaw occurs when the plane of the offset portion is in a substantially horizontal position. However, by virtue of the position of the staple transversely of the base the latch is permitted to fall to either side of the staple so that the offset portion may be tipped or inclined out of the horizontal position providing for its proper engagement with the bait treadle. When the offset portion is tipped the sensitivity of its engagement with the bait treadle for releasing the jaw is appreciably reduced so that a greater force is required on the treadle to release the jaw. Because of the relative assembly positions of the latch loop with the staple the pressure exerted on the latch, during the setting operation, by the spring actuated jaw retains the latch in the position it has on initial engagement of the latch and jaw. In other words the engagement of the jaw with the latch does not act to position the plane of the offset portion in a horizontal position so that the offset portion is just as likely to be engaged with the treadle when the offset portion is tipped relative to a horizontal plane as when the offset portion is in a substantially horizontal position. The setting operation of the trap is thus generally inconvenient as well as inefficient.

It is an object of this invention, therefore, to provide an improved animal trap.

It is another object of this invention to provide an animal trap of an all metal construction which is simple in design, comprised of but a minimum number of parts, and which is simply and conveniently locked in a set position which provides for the most efficient operation thereof.

Yet another object of this invention is to provide an animal trap in which a pivoted latch for latching a spring actuated jaw is positioned for proper engagement with a pivoted bait treadle by the action of the jaw thereon.

Yet another object of this invention is to provide an animal trap having a spring actuated jaw and a latching member therefor, in which the latching member is pivotally supported for movement in an arcuate path lying in a vertical plane longitudinally of the trap.

A feature of this invention is found in the provision of an animal trap in which a preassembled jaw unit is completely assembled with an associated base member merely by a releasable locking engagement of co-acting parts on the jaw unit and base member.

A further feature of this invention is found in the provision of an animal trap in which a pivoted bait treadle is rotatable, when the trap is in a sprung position, to a position entirely below the upper level of the trap so as to facilitate the packing of a plurality of the traps in a superposed relation for shipping and storage purposes.

Still another feature of this invention is found in the provision of an all wire animal trap in which all of the component parts of the trap are formed by simple bending operations.

Yet another feature of this invention is found in the provision of a preassembled jaw unit including axis means which is adapted for operative assembly with a wire base member having a pair of transversely aligned open loop portions by merely inserting the axis means within such loop portions.

Further objects, features, and advantages of this invention will become apparent from the following description when taken in connection with the accompanying drawing in which:

Fig. 1 is a plan view of one embodiment of the animal trap of this invention showing the same in a set position;

Fig. 2 is a plan view of a preassembled base unit for the trap shown in Fig. 1;

Fig. 3 is a side view of the base unit of Fig. 2;

Fig. 4 is a preassembled jaw unit for the trap shown in Fig. 1;

Fig. 5 is a longitudinal sectional view of the jaw unit as seen along the line 5—5 in Fig. 4;

Fig. 6 is a fragmentary sectional view as seen along the line 6—6 in Fig. 1;

Fig. 7 is a plan view of an animal trap which is similar in all respects to the animal trap of Fig. 1 except for modifications in the construction of the bait treadle;

Fig. 8 is a fragmentary side view of the trap shown in Fig. 7;

Fig. 9 is a modified form of the invention; and

Fig. 10 is a side view of the trap shown in Fig. 9.

In practicing this invention there is provided an animal trap having a base member formed of a single piece of wire with an upwardly projecting open loop in each longitudinal side and an upwardly projecting closed loop at one end thereof. The two side loops are in alignment transversely of the base, while all three loops are positioned in planes extended longitudinally of the base. A preassembled jaw unit includes a spring actuated wire jaw and axis means for pivotally supporting the jaw on the base member. The spring for actuating the jaw has a pair of coil portions axially spaced on the axis means, with a bait treadle pivotally supported on the axis means intermediate the spring coil portions. The latch for latching the jaw member in a set position is composed of a single piece of wire formed with an offset portion at one end and a closed loop at the opposite end for pivotal connection with the end loop on the base. The latch loop and offset portion lie in a common plane, with the arrangement of the base end loop and latch loop providing for a pivotal movement of the latch in a vertical plane longitudinally of the base. The jaw unit is operatively assembled with the base merely by positioning the jaw axis means within the two side loops on the base.

Referring to Fig. 1 of the drawing one form of the animal trap of this invention is shown as including a preassembled base unit 15 and a preassembled jaw unit 16. The base unit (Figs. 2 and 3) is comprised of a base member 17 formed from a single piece of wire with a substantially rectangular section 18 and a substantially triangular section 19 which are positioned in a coplanar relation and connected by portions 21. Each longitudinal side 22 of the rectangular section 18, and hence of the base 17, is provided with an upwardly projecting loop 23 having an open bottom 24, the loops 23 being in alignment transversely of the section 18 for a purpose to be later noted. The ends 25 and 27 of the wire piece forming the base 17 are connected together at one end of the base and in the triangular section 19 thereof. The end 25 has an eyelet portion 26 the plane of which is substantially in the plane of the base 17. The end 27 is formed with a loop 28 projected upwardly from the base member with the side portions 30 and 31 thereof positioned in a plane longitudinally of the base. The side portion 30 is extended through the eyelet 26 at the wire end 25 so that the wire ends 25 and 27 are locked together by the co-action of the eyelet 26 and the loop 28 in an obvious manner.

A latch 32 for latching in set position a spring actuated jaw 33, to be later described, is also formed from a single piece of wire with an offset or bent portion 34 adjacent one end thereof, and a loop portion 36 at the opposite end thereof. As is clearly shown in Fig. 3 the offset portion 34 and the loop 36 of the latch 32 lie in a common plane. The loop 36 is inserted through the loop 28 on the base member 17 to pivotally connect the latch 32 with the base. The latch 32 is thus pivotally movable both in a plane substantially parallel with the plane of the base member 17, and in a plane normal to the plane of the base member and extended longitudinally thereof.

The jaw 33, previously mentioned, is provided in a single piece of wire and formed as part of the preassembled jaw unit 16 (Figs. 4 and 5). The jaw 33 is of a substantially U-shape and is formed at the end 37 of each leg 38 thereof with an eyelet portion 40. Connected across the leg ends 37 and inserted through the eyelets 40 at such ends is a wire axis means 39. The ends of the axis means 39 are suitably pinched or peened so as to retain the axis means against axial movement outwardly from the jaw member 33. A one piece spring 41 for actuating the jaw 33 is formed with spaced coil portions 42 carried on the axis means 39, the spring coil portions 42 having their adjacent ends connected by a radially extending U-shaped portion 43 while the outer end of each spring portion 42 is provided with a radially extending tension arm 44. A bait treadle 46 constructed from a single piece of wire is provided at one end with a bait hook 47 and at its opposite end with a coil or eyelet portion 48 for receiving therein the axis means 39. The bait treadle is pivotally supported on the axis means 39 intermediate the spring coil portions 42. A catch portion 49 of substantially U-shape adapted for operative engagement with the offset portion 34 of the latch 32, is projected substantially radially from the treadle eyelet portion 48 and in a direction upwardly from the axis means 39. Extended axially from the catch portion 49 is a straight portion 51 for guiding the offset portion 34 into engagement with the catch portion 49 in a manner which will be later explained. From a consideration of Figs. 4 and 5 it is thus seen that the spring 41, bait treadle 46 and axis means 39 are preassembled with the jaw member 33 as a complete unit.

In the assembly of the base unit 15 with the jaw unit 16 the section 18 of the base 17 is inserted within the jaw member 33 with the portions 50 of the axis means 39 adjacent the jaw legs 38 positioned within a corresponding loop 23 through the open end 24 thereof. With the base unit 15 and jaw unit 16 in this relative assembly position the connecting portion 43 between the spring coil portions 42 is engaged with the connecting portions 21 of the base member 17. To complete the assembly of the animal trap the tension legs 44 on the coil spring portions 42 are moved into engagement with a corresponding offset portion 52 in each leg of the jaw member 33, this position of the tension arms 44 being shown in Fig. 1. The assembly is thus accomplished easily and simply by merely locking the two units together, so that the time required for the assembly is reduced to a minimum. Each of the trap units 15 and 16 is thus capable of being separately assembled and are brought together only when the final assembly of the trap is to be made.

When the trap is in a sprung position the jaw member 33 is positioned over the section 18 of the base member 17. In setting the trap, the jaw member is rotated against the tension of the spring 41 from a position over the section 18 to its position shown in Fig. 1 over the triangular section 19. The jaw is retained in a set position by the cooperative action of the latch 32 and bait treadle 46 in a manner now to be explained.

As shown in Fig. 1 the side portions 53 and 54 of the latch loop 36 are of a length such that on positioning of the jaw 33 in a set position both of such side portions are engaged by the transverse portion 55 of the jaw. With both side portions 53 and 54 of the loop 36 engaged by the jaw portion 55 the pressure exerted on these side portions by the jaw acts to retain the plane of the loop 36 in a substantially horizontal position.

Since the plane of the loop 36 lies in a plane common with the offset portion 34, the offset portion 34 is likewise moved into a substantially horizontal position. On movement of the offset portion 34 toward an engaging position with the treadle 46, it engages the treadle guiding portion 51 which positions the catch portion 49 for receiving the offset 34 between the legs thereof. With the jaw 33 acting on the side portions 53 and 54 of the loop 36 to retain the same in a substantially horizontal position at all times during the setting operation, the plane of the offset portion 34 is substantially normal or at right angles to the plane of the catch portion 49 on engagement of the offset portion with the treadle. This relative position of the offset portion 34 and catch portion 49 is shown in Fig. 6. Any tilting or inclining of the offset portion from a substantially horizontal position at the time of its engaging the catch portion 49 is thus eliminated by the relative arrangement of the loops 28 and 36 which permits the latch 32 to be pivotally adjusted by the jaw 33. The offset portion 34 is thus always set in its most sensitive position for releasing the treadle and hence the jaw 33.

In Figs. 7 and 8 there is shown an animal trap which is similar in all respects to the animal trap of Fig. 1 except for the construction of the bait treadle 46' thereof. Similar numerals of reference will be used, therefore, to designate like parts. The bait treadle 46' is provided in a single piece of wire formed in a manner similar to the bait treadle 46 except for the elimination of the guiding portion 51 on the bait treadle 46. As is apparent from Fig. 1 the bait treadle 46 is prevented from being rotated from its position to the left of the axis means 39, as viewed in Fig. 1, to a position to the right of the axis means 39 because of the engagement of the guiding portion 51 with the intermediate spring portion 43. The treadle 46, when the trap is in a sprung position, is thus restricted to its position to the left of the axis means 39 with the catch portion 49 projecting upwardly above the loop portions 23. In packing the traps, therefore, in a superposed relation for shipping or storage purposes appreciable space is utilized in a vertical direction merely to accommodate the catch portions 49. The bait treadle 46', however, is capable of being rotated from its normal operating position shown in full lines in Fig. 8, with the catch portion 49' extending upwardly above the axis loop 23, to its dotted line position shown in Fig. 8 with the catch portion 49' located intermediate the axis means 39 and the base member 17. The bait treadle 46' is thus rotatable through a distance of substantially 180°, and when in its dotted line position, shown in Fig. 8, is completely below the level of the loops 23. The vertical height of the trap is thus appreciably reduced so as to provide for the superposed positioning of a plurality of traps in a minimum of space. The operation of the trap shown in Figs. 7 and 8 is similar in all respects to the operation of the trap in Fig. 1 so that a further description thereof is believed to be unnecessary.

With reference to Figs. 9 and 10 there is shown a modified embodiment of the invention having a base unit 15 previously described in connection with Fig. 1. The jaw unit 16' is formed from a single piece of wire, one portion 39' of which serves as the axis means for pivotally supporting the jaw 33' on the base 15. The axis portion 39' is extended transversely of the jaw 33' with the free end 57 thereof, which is one end of the wire piece forming the jaw, being inserted within an eyelet 58 provided at the other end of the wire. The spring 41 for actuating the jaw 33' is identical in construction to and is operatively assembled on the axis means 39' in all respects similar to the spring 41 described in connection with Fig. 1. A bait treadle 59 of substantially flat form has a bait hook 61 and a bearing or strap portion 62 punched or bumped out thereon. The bait treadle 59 is located intermediate the spring coil portions 42 with the axis means 39' being inserted within the opening provided by the bearing portion 62. A catch portion 63 projects upwardly from one side of the body portion of the treadle 59 so as to be substantially normal to said body portion and has a longitudinally extending opening 64 therein for receiving the offset portion 34 of the latch 32.

In the assembly of the jaw unit 16' the jaw member 33' is initially preformed with the end 58 thereof left straight. The spring 41 and bait treadle 59 are stacked axially of the axis portion 39', and then the end 58 is looped by a forming operation so as to extend about the open or free end 57 of the axis portion 39'. The spring 41 and bait treadle 59 are thus retained in their relative positions on the axis means 39'. The base unit 15 and jaw unit 16' are assembled together in a manner similar to that previously described for the base unit 15 and jaw unit 16 of Fig. 1.

In the setting of the animal trap of Figs. 9 and 10 the offset portion 34 is positioned in a substantially horizontal plane by the action of the jaw portion 55' on the side portions 53 and 54 of the latch loop 36. This positioning of the offset portion 34 locates it in a plane which is substantially normal to the plane of the catch portion 63 on the bait treadle 59. The offset portion 34 is thus capable of being received within the opening 64 in a manner which provides for the most sensitive release of the jaw 33' by the latch 32.

From a consideration of the above drawings and description, it is seen that the invention provides an animal trap of an all metal construction which is comprised of a minimum number of component parts, each of which is readily performed by simple bending or stamping operations. The jaw and base units of the trap are of a preassembled construction adapted to be operatively assembled entirely by a locking engagement of coacting portions thereof. The final assembly of the trap may thus be accomplished in a minimum of time since all of the parts forming each unit are already operatively retained in their relative positions prior to such final assembly. The positioning of the base pivot for the latch with the side portions thereof in a plane longitudinally of the base permits a free pivotal movement of the latch in both a horizontal and a vertical plane. As a result the engagement of the spring actuated jaw with the side portions of the latch loop acts to adjust the offset portion in a proper plane relative to the plane of the catch portion on the bait treadle so that the trap is always set in its most sensitive releasing position. Since the bait treadle is movable to release the latch 32 and hence the trap jaw upon movement thereof in any one of four directions, namely, in either direction in both a horizontal and a vertical plane, the proper engaging position of the latch with the treadle provides in all an animal trap which is capable of operating with a high degree of efficiency.

It is to be understood that although the invention has been described with specific reference to several preferred forms thereof that it is not to be so limited since the parts thereof and their relative arrangement can be changed within the scope of this invention as defined by the appended claims.

I claim:

1. In an animal trap including a spring actuated wire jaw, a wire base member, a wire latch having a loop at one end pivotally connected with said base, a pivoted bait treadle having an upwardly projecting catch portion thereon, said latch having an offset portion at the opposite end thereof engageable with said catch portion to retain said jaw in set position, with said offset portion and latch loop being in a common plane, with the side portions of said latch loop being in engagement with said jaw when the jaw is in set position to locate said common plane substantially parallel to the plane of said bait treadle.

2. An all wire animal trap including a pivoted spring-actuated jaw member, a base including an upwardly projecting loop portion positioned longitudinally of said base, axis means pivotally supporting said jaw member on said base, a bait treadle pivotally supported on said axis means having a catch portion projected transversely of said axis means and a guiding portion extending axially of said axis means, and a latch member for latching said jaw in set position having an offset portion at one end operatively engageable with said catch portion and a loop at the opposite end thereof for pivotal connection with said base loop portion, said offset portion and latch loop being in a common plane, said latch loop having the side portions thereof engaged by said jaw to position said offset portion relative to said guiding portion for movement into operative engagement with said catch portion, with said side portions being in a substantially horizontal plane when said jaw is in set position.

3. An animal trap including a pivoted spring-actuated jaw member, a base member, axis means projecting upward from said base member to pivotally support said jaw member, a bait treadle pivotally supported on said axis means, and a pivoted latch for latching said jaw in set position having an offset portion at one end, said bait treadle having a catch portion operatively engageable with said offset portion to retain said jaw in a set position, said catch portion with the jaw in a set position projecting upwardly above the level of said axis means and being of no greater height than the clearance between said axis means and one supporting surface of said base member, whereby said bait treadle, when said jaw is in a sprung position, is rotatable to a position wherein all parts thereof are disposed between the top of said axis means and said one supporting surface of said base.

4. An animal trap including a pivoted spring-actuated jaw member, a one piece wire base having an upwardly projecting loop portion is each longitudinal side thereof open at the bottom, said loop portions being in alignment transversely of said base, axis means receivable in said loop portions through the bottoms thereof for pivotally supporting said jaw member on said base, a bait treadle pivotally supported on said axis means having a catch portion thereon, and a pivoted latch for latching said jaw in set position having an offset portion at one end operatively engageable with said catch portion, said catch portion with the jaw in set position extending above the top level of said loop portions, said bait treadle, when said jaw is in a sprung position, being rotatable to locate said catch portion between said axis means and said base whereby said bait treadle is completely below the top level of said loop portions.

5. An animal trap including a pivoted spring-actuated jaw, a base member, axis means including parts projecting upward from said base member to pivotally support said jaw, a bait treadle pivotally supported on said axis means, a pivoted latch having an offset portion at one end which extends transversely of said base, said bait treadle having a catch portion thereon operatively engageable with said offset portion when said offset portion is moved transversely relative to said base, thereby to retain said jaw in a set position, said catch portion projecting upwardly from said treadle above the level of said axis means when said jaw is in said set position and being of no greater height than the clearance between said axis means and one supporting surface of said base, whereby said bait treadle, when said jaw is in a sprung position, is rotatable through substantially 180° from its jaw setting position to a position wherein all parts thereof are disposed between the tops of said axis means parts and said one supporting surface of said base.

6. An animal trap including a spring-actuated jaw, a base having an upwardly extending loop portion positioned longitudinally thereof, a latch for latching said jaw in set position having an offset portion at one end, and a loop at the opposite end thereof for pivotal connection with said loop portion, said offset portion and latch loop being in a common plane, and a bait treadle having a substantially inverted U-shaped catch portion extending upwardly therefrom for operative engagement with said offset portion, said latch loop having side portions of a length such that on setting of said jaw said side portions are engaged by said jaw to position said common plane substantially normal to the plane of said catch portion.

7. In an animal trap including a pivoted spring-actuated wire jaw, a wire base having an upwardly projecting open loop portion in each longitudinal side thereof, said loop portions being in alignment transversely of said base, said base having a third upwardly projecting loop portion at one end positioned in a plane longitudinally of said base, axis means for pivotally supporting said jaw receivable in said side loop portions, a wire latch having a loop at one end for pivotal connection with said third loop portion, a substantially flat bait treadle pivotally supported on said axis means having a portion extending upwardly therefrom with an opening therein, said latch having an offset portion at the other end thereof receivable in said opening to retain said jaw in set position, said offset portion and latch loop being in a common plane, said latch loop having side portions engaged by said jaw on setting thereof to position said common plane substantially normal to the plane of said upwardly extending portion.

8. In an animal trap, a wire base having sides which converge toward each other at a point disposed longitudinally of said base and having upwardly projecting loop portions in alignment transversely thereof, a jaw unit including a jaw member and axis means disposed within said loop portions to pivotally support said jaw member for movement between set and sprung positions, and a spring for actuating said jaw member from its set position to its sprung position, said spring having a pair of spaced coil portions carried on said axis means and an intermediate radially extending portion engaging the converged portions of said base.

9. In an animal trap, a wire base comprising portions forming a rectangle and other portions forming a triangle, one apex of said triangle being disposed substantially centrally of one side of said rectangle, said base also having upwardly projecting loop portions adjacent opposite ends of said one side of said rectangle, a jaw unit including a jaw member and axis means disposed within said loop portions to pivotally support said jaw member for movement between set and sprung positions, and a spring for moving said jaw from its set to its sprung position, said spring including a pair of spaced coil portions carried on said axis means and an intermediate radially extending portion engaging the portions of said base which meet at said one apex of said triangle.

10. In an animal trap, a wire base comprising portions forming a rectangle and other portions forming a triangle, one apex of said triangle being disposed substantially centrally of one side of said rectangle, said base also having upwardly projecting loop portions adjacent opposite ends of said one side of said rectangle and a third loop portion disposed centrally of the side of said triangle which opposes said one apex, a jaw unit including a jaw member and axis means disposed within said first-named loop portions to pivotally support said jaw member for movement between set and sprung positions, a spring for moving said jaw from its set to its sprung position, said spring including a pair of spaced coil portions carried on said axis means and an intermediate radially extending portion engaging the portions of said base which meet at said one apex of said triangle, a bait treadle pivotally supported upon said axis means between said spring coil portions, and a wire latch pivotally connected at one end with said third loop portion and provided with an opposite end which is engageable with said treadle to hold said jaw member in a set position.

HERBERT A. STILSON.